(12) United States Patent
Moore et al.

(10) Patent No.: US 9,172,250 B2
(45) Date of Patent: Oct. 27, 2015

(54) ELECTRICAL DISTRIBUTION SYSTEM

(75) Inventors: Gareth E. Moore, Nottingham (GB);
Jason E. Hill, Newcastle-Upon-Tyne (GB); Seamus Garvey, Nottingham (GB)

(73) Assignee: ROLLS-ROYCE plc, London (GB)

(*) Notice: Subject to any disclaimer, the term of this patent is extended or adjusted under 35 U.S.C. 154(b) by 648 days.

(21) Appl. No.: 13/524,680

(22) Filed: Jun. 15, 2012

(65) Prior Publication Data

US 2013/0002014 A1    Jan. 3, 2013

(30) Foreign Application Priority Data

Jun. 28, 2011  (GB) .................................. 1110916.2

(51) Int. Cl.
| | | |
|---|---|---|
| *H02J 1/00* | (2006.01) | |
| *H02J 3/00* | (2006.01) | |
| *H02J 3/40* | (2006.01) | |
| *H02J 3/34* | (2006.01) | |
| *H02J 3/08* | (2006.01) | |
| *H02J 3/38* | (2006.01) | |

(52) U.S. Cl.
CPC ... *H02J 3/40* (2013.01); *H02J 3/08* (2013.01); *H02J 3/34* (2013.01); *H02J 3/381* (2013.01); *Y10T 307/305* (2015.04); *Y10T 307/718* (2015.04)

(58) Field of Classification Search
CPC ................. H02J 3/34; H02J 3/08; H02J 3/40; Y10T 307/718
USPC .......................................................... 307/84
See application file for complete search history.

(56) References Cited

U.S. PATENT DOCUMENTS

| | | | |
|---|---|---|---|
| 5,627,744 A | | 5/1997 | Baker et al. |
| 5,764,502 A | * | 6/1998 | Morgan et al. ................... 363/65 |
| 2004/0119454 A1 | | 6/2004 | Chang et al. |
| 2005/0273206 A1 | * | 12/2005 | McGinley ..................... 700/291 |

FOREIGN PATENT DOCUMENTS

EP            2 209 206 A1    7/2010

OTHER PUBLICATIONS

Andrade et al., "Design of the Boeing 777 Electric System," Aerospace and Electronic Conference 1992, *NAECON 1992, Proceedings of the IEEE 1992 National*, 1992, pp. 4-11 vol. 3.
Oct. 27, 2011 Search Report issued in British Application No. GB1110916.2.
European Search Report issued in European Application No. 12 17 2201 dated Nov. 28, 2012.

* cited by examiner

*Primary Examiner* — Carlos Amaya
(74) *Attorney, Agent, or Firm* — Oliff PLC

(57) ABSTRACT

An electrical generating system for aircraft with one or more engines includes a plurality of generators associated with the engines so as to produce respective AC outputs. The frequencies of these outputs can differ from each other, as a result of differing engine speeds and/or deliberate design, but they are to be connected to a common bus to avoid redundancy of wiring. One or more converters are present between the generators and the bus for adjusting the output frequency of the generators to provide an AC output voltage at a common bus frequency. The system includes a control system for setting the AC bus frequency in such a way that it can vary with time. The bus frequency may follow the natural frequency of the engine, and only small converters are needed to make the already approximately equal generator frequencies identical, so that they can all feed the common bus.

11 Claims, 2 Drawing Sheets

ELECTRICAL DISTRIBUTION SYSTEM

This invention relates to electrical generation and distribution systems, and has particular relevance to systems for aircraft, where there are several generators present for supplying electrical power.

In order to provide security of supply if a generator fails, or if an engine fails, electrical systems on aircraft tend to have several generators. For instance, on a twin-engine aircraft there will often be two generators for each engine, typically a main generator and a backup generator or two equally sized generators. In addition, there may be a separate, smaller, auxiliary power unit (APU), and also the facility to plug the system into a ground-based power supply when the aircraft is stationary.

Currently, aircraft electrical distribution buses are arranged in such a manner that the main generating sources are never run in parallel, because they are not synchronised in frequency or phase. Hence, there must be switches, in particular contactors, to allow reconfiguration of the buses to be powered from different sources, namely the main generators, the backup generators and the auxiliary power unit(s). A known system is illustrated in FIG. 1.

Figure 1:
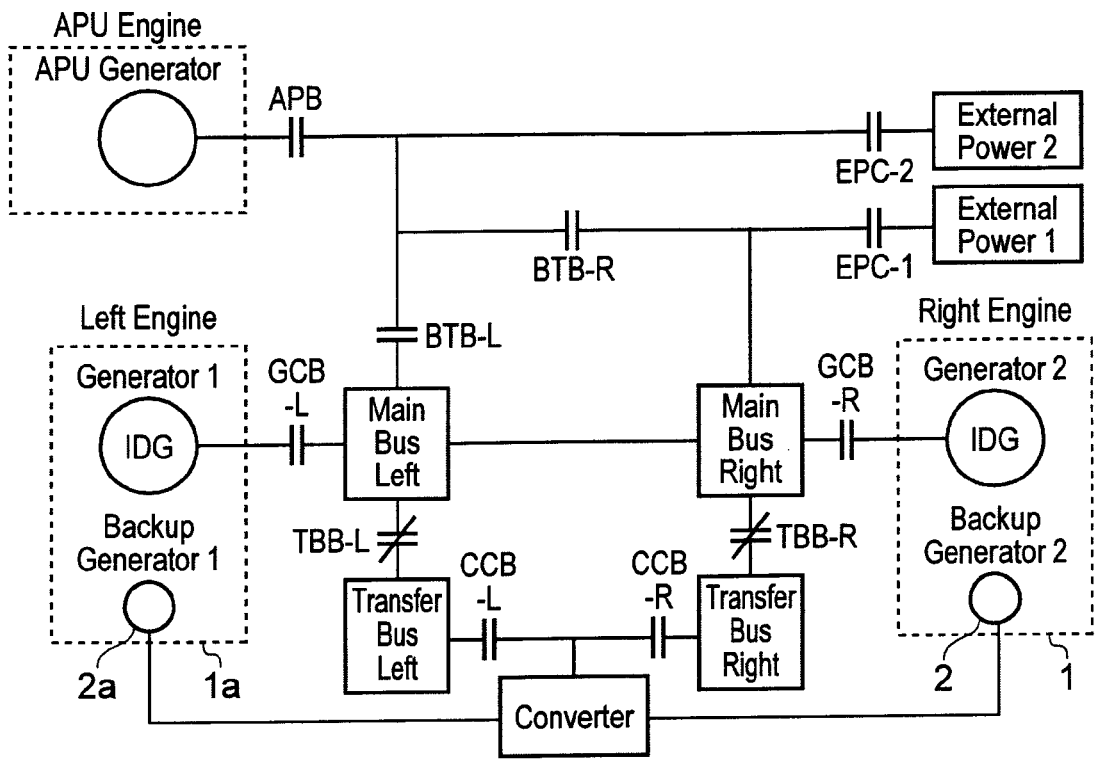

FIG. 1 shows two engines, 1 and 1a, with integrated drive generators IDG. These are connected to left and right main buses at 115 V AC, via respective generator contact breakers GCB. An APU and two external power sources are also shown, connected by respective breakers. Backup generators 2 and 2a, one for each engine, are also capable of being connected in via a common VSCF (variable-speed constant-frequency) converter, breakers and left and right transfer buses.

In general, only one power source will be connected at any one time (apart from transients) to a given bus, but it may be noted that the auxiliary power units are sometimes connected in parallel with a main engine generator. This is because the frequency of an auxiliary power unit can be allowed to vary, since no other services depend on its frequency, so it can be synchronised. This electrical distribution arrangement has been implemented on both constant- and variable-frequency generation systems.

Reference may be made to the article by L. Andrade and C. Tenning, "Design of the Boeing 777 electric system," in *Aerospace and Electronics Conference*, 1992. *NAECON* 1992, *Proceedings of the IEEE 1992 National*, 1992, pp. 1281-1290 vol. 3, which describes a microprocessor-controlled main/backup dual system which reduces wiring by using a bus system.

The presence of multiple buses is necessary because the generators in practice produce AC output at different frequencies, as will now be explained.

First, with aircraft power supplies it is common practice at present to ensure that the two generators coupled to one engine spin at slightly different rotational speeds even though both are mechanically coupled to the same gearbox. One might find, for example, that the number of gear teeth on the gear-wheel used for transmitting power into one generator has 54 teeth on it whilst the number of gear teeth on the gear-wheel used for transmitting power into the second generator has 53 teeth. This mismatch of speeds ensures that if any mechanical problems occurring at a particular frequency do not manifest themselves simultaneously on both generators.

There are further reasons why speed mismatches are likely to be present. On a single aircraft, even in steady flight, it will often be the case that the rotational speed of the power-take-off shaft of one engine is not quite the same as the rotational speed of the power-take-off shaft of a second engine on the aircraft. The most important function of the engines is to provide thrust and the priority of the engine control system will usually be to adjust engine speeds as necessary to ensure that the pilot commanded thrust is generated. This typically results in the engine rotational speeds being approximately, but not exactly, equal. Thus in the normal situation of aircraft operation, multiple generators are spinning at similar but not identical rotational speeds; therefore they cannot be electrically paralleled on a common bus.

In order to achieve some robustness in the provision of electrical power, present systems provide multiple redundant power paths. It must be possible for either engine to be lost and for essential electrical power still to be supplied by the remaining engine. In effect, present systems provide multiple power transmission paths. A serious price is paid for this redundancy of power transmission paths, namely that the aircraft carries a substantially greater weight of conductors than is strictly necessary. It would in theory be possible to use converters to match the frequency to the desired bus frequency, but they would have to be very large to handle the power requirement.

According to the invention there is provided an electrical distribution system according to claim 1.

The invention recognises that, at least for aeronautical applications, while the frequency of the input to the generators may vary over a wide range—at least a factor of 2—the speeds of the individual generators will differ from each other by typically only a few per cent at any one time. By allowing the frequency $f_B$ of the bus to "drift" with the overall engine speed, therefore, only a small adjustment of the output frequency of the individual generators is needed, and only a small converter is needed to do this.

One difference from common practice in aircraft power distribution is that, instead of having windings on the rotors that only have the capability of generating "d-axis" magnetic flux (a wound-field synchronous machine), the rotors in this case each have a set of windings which are capable of producing a rotating magnetic field pattern relative to the body of the rotor itself. The arrangement envisaged here is similar in nature to the "doubly-fed-induction-generator" (DAG) configuration, which is now quite common in wind-turbine generation applications, e.g. as shown in U.S. Pat. No. 7,800,243 (Bendixen et al./Vestas). However, in wind-power generation, converter and generator size and weight are less of a problem.

One distinction between the usual understanding of DAG operation and embodiments of the present invention is that, in the conventional case, the frequency at which main power is output is a constant (fixed by the grid frequency). However, in the present case, the common frequency itself is allowed to be variable.

The effect of allowing the supply frequency to be variable is very substantial indeed. In aircraft generation, it is now common to have supply frequencies which vary between 350 Hz and 800 Hz, because the mechanical speeds of the gearbox which drives the generators will vary over a range of a similar ratio. If all electrical power in the aircraft was controlled to be at a constant frequency of, say, 700 Hz, and it was desired to achieve this by using DFIGs, then, at the top end of the speed range, the generator rotors would be spinning approximately (800/700) times too fast to produce 700 Hz using a low-frequency field on the rotor, and it would be required to take roughly 14.3% of the power developed by the generator out from the rotor. By contrast, at the bottom end of the speed range, the generator rotors would be spinning at approximately 50% of the natural speed that they should spin at to produce 700 Hz using a low-frequency field on the rotor, and it would be necessary to inject 50% of all of the power generated through the rotor. Injecting or extracting large fractions of total machine power through the rotor is extremely undesirable because the size of the converter required to do this injection/removal is substantial.

Since, with embodiments of the present invention, the bus frequency is allowed to drift to follow the overall engine speed, all generators will be running at about this speed and there is no need to make substantial frequency corrections on individual rotors of the multiple-generator system. The bus frequency $f_B$ at a given time would be chosen so that rotational speeds of some of the generators would naturally give rise to a slightly higher frequency than $f_B$ and the other generators would give rise to slightly lower frequency than the bus frequency. However, it would instead be possible to pick one of the frequencies and have the other generators match this frequency.

The frequency correction required on each generator is a direct determinant of the power of the converter rating required for that individual generator. By allowing the bus frequency to be a variable determined as the "most natural" frequency for the bus at that time, the ratings of the power converters required can be greatly reduced.

The present invention can be thought of as extension the principle that makes it possible for many wind turbines in a single wind farm to contribute power simultaneously to a single constant-frequency power grid. The extension is that the power-grid does not have to be constant frequency. Advantages of applying the principle in particular for aeronautical applications are as follows:
  (a) instead of having individual power connections from each generator to each major load, the requirement is only for a single power bus fed by each generator and supplying all loads. The total mass of conductors on board the aircraft is reduced.
  (b) the robustness of the system is increased. Conductors themselves are highly reliable and redundancy simply for electrical power transmission is rarely justified. The ability to share power between multiple generators improves the overall reliability of the system.
  (c) the ability to share power ultimately reduces the total losses in the system and improves the opportunity for managing generator life. For example, drawing 80 kVA from each of four generators simultaneously rather than 160 kVA from each of two generators will reduce the total copper losses in the generators by a factor of around 2. Alternatively, if the performance of one generator is impaired, the load on it can be reduced accordingly.

The AC generators driven directly from prime movers, i.e. the engines, will usually have the main electrical power-output windings on the stator, as is already common practice in aerospace applications.

For a better understanding of the invention, embodiments of it will now be described, by way of example, with reference to the accompanying drawings, in which:

FIG. 1 shows a known electrical distribution arrangement for an aircraft, as already described;

Future 2 shown a basic embodiment of the invention; and

Figure 3:
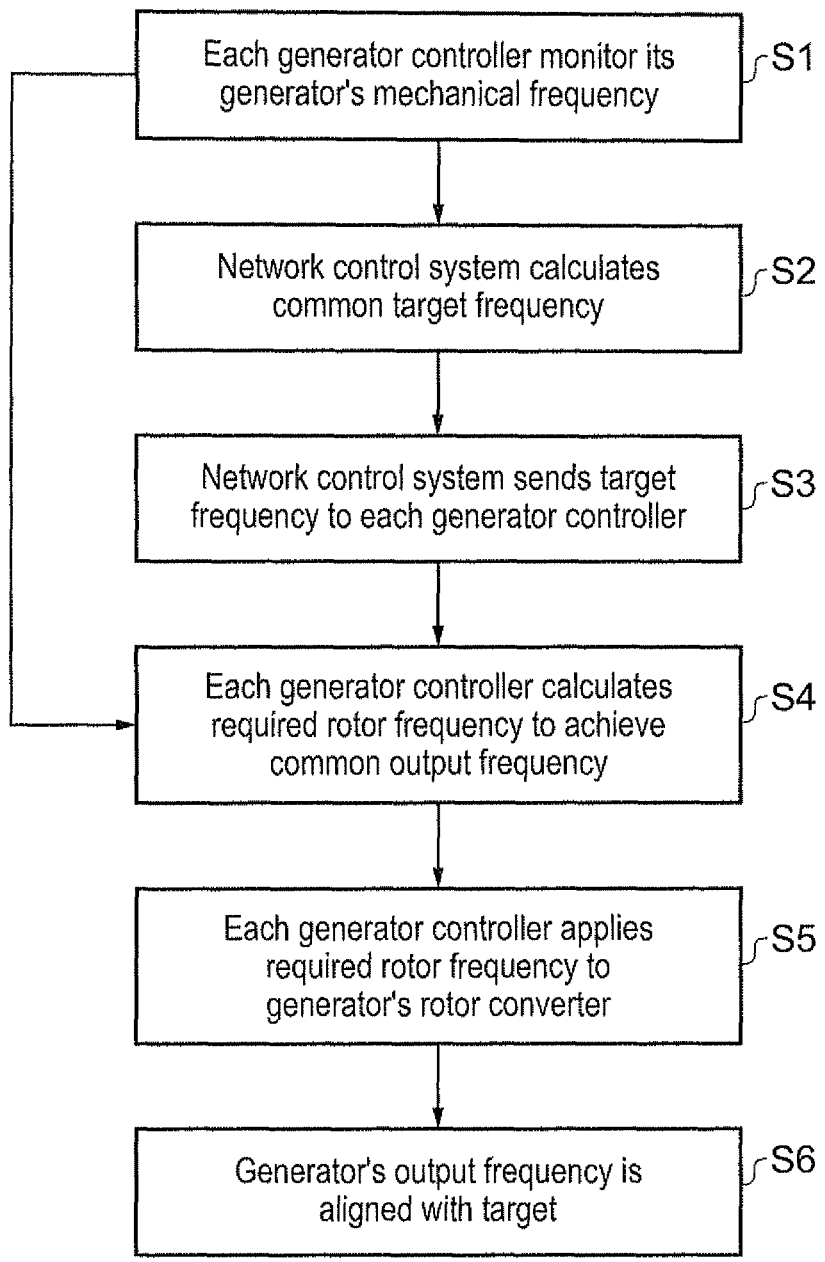

FIG. 3 shows the control steps for setting the bus frequency.

Figure 2:
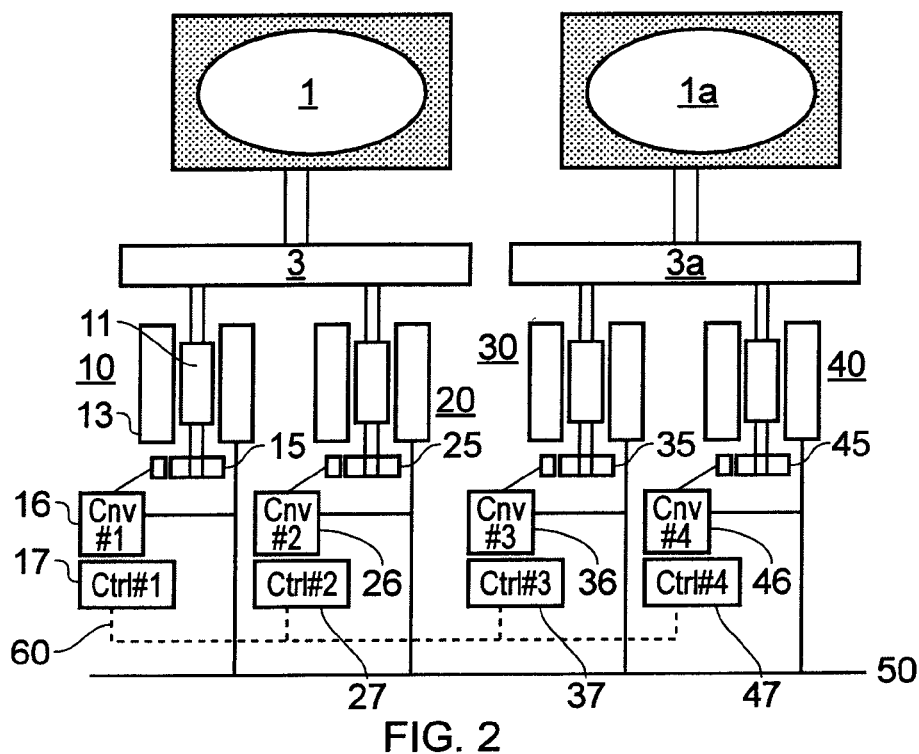

FIG. 2 shows a possible configuration of the system in the context of an aircraft system where two engines 1, 1a each drive, via engine gearboxes 3 and 3a, independent generator machines 10, 20 and 30, 40. Each generator has a rotor, e.g. 11, and a stator, e.g. 13, forming the respective electrical machine. Power is fed from the stators 13, 23 . . . into a common power bus 50. Respective converters 16, 26 either take power from the machines via the rotors and power transfer devices 15, 25, 35, 45 and feed it into the bus, or vice versa, as will be explained.

The generators 10, 20, 30, 40 draw power from their respective gearboxes 3, 3a and transfer this power into the air gap of the machine. Typically the input speed from the gearbox has approximately a 2:1 ratio. The amount of mechanical power being drawn from any one generator is determined directly by the field strength within that generator. This can be varied.

If any one generator is spinning at exactly "synchronous speed", i.e. the mechanical speed of the machine which ensures that its electrical output matches the desired bus frequency, then no power is fed from the air gap into the rotor. Some small amount of power must be drawn by such generators to feed the copper losses on the rotor. This can only occur if the power transfer device can create a DC rotor field.

If any one generator rotor is spinning faster than "synchronous speed", then it draws some power from the magnetic field in the air gap (this power ultimately coming from the mechanical movement of the generator rotor). This power is exported from the rotor into the associated converter 16 and thence to the common power bus 50. The amount of power drawn by this generator rotor from the air gap magnetic field is proportional to the degree of "overspeed". Very small proportions of "overspeed" are obviously associated with very small levels of power passing through the rotor, and hence with a low demand made on the converter.

Conversely, if any one generator rotor is spinning slower than "synchronous speed", then it must be supplying some power into the magnetic field in the air gap. That power ultimately comes from the converter connected to the rotor via the power transfer device. This power imported into the rotor from its associated converter is (roughly) proportional to the degree of "underspeed".

The generators 10-40 are all Doubly-Fed Induction Generators (DFIG), allowing a change of generator output frequencies, in turn allowing generators driven at different speeds to be paralleled. The use of a DFIG has always been deemed inappropriate for aerospace electrical networks on account of the converter size and weight. However, if the DFIG is only used for small frequency adjustments, it need not be large. Since the network is adapted to work at variable frequency, small frequency adjustments are needed to allow the parts to run in parallel. Parallel generators present the opportunity for network redesign, allowing better redundancy and fault accommodation, improved load sharing and reduced network weight.

The power transfer devices 15, 25, 35, 45 will usually themselves be electric machines. They could use brush contacts but these are not considered reliable enough for aircraft application, so a better solution is for the transfer devices themselves to be rotating transformers or DFIGs, of smaller format than the main generators.

A control system, not shown in its entirety, sets the bus frequency $f_B$. It may be either centralised or, as here, distributed, with a controller 17-47 in each converter 16-46. These converter controllers communicate with each other and with a network controller, not shown, via a bus 60.

FIG. 3 shows the steps in the control process, which runs continually. In step S1, each generator controller 17-47 monitors its generator's mechanical frequency and feeds the result to the network controller. The latter then calculates the best "average" frequency. This then becomes a target frequency $f_B$ in Step S3 and is returned to the converter controllers. The latter then in step S4 calculate what change is needed for their respective generators to achieve the common target frequency set, and in step S5 extracts or applies power to achieve this.

In one embodiment, the method can include selecting one of the generators as a primary generator and using its output frequency as the target frequency.

In a modification, the frequency change offered by a Doubly-Fed Induction Generator (DFIG) can also be achieved mechanically using two electrical machines and a differential gearbox. This is likely to be heavier, but it is another option.

The weight of the converters associated with each DFIG could be reduced with the use of a low-power DC bus to supply multiple converters. At any one instant, the common target frequency for the common AC bus could be chosen such that some converters on the bus would be supplying power to an associated rotor and simultaneously some converters would be drawing power from an associated rotor, leaving the total power being fed into the converter DC bus at theoretically zero. Losses and a lack of balance between all the rotors on the bus would actually result in a small power demand or supply but this concept would still potentially minimise converter size and weight. A disadvantage would be that the common DC bus would constitute a single, non-redundant component for safety purposes.

In a further modification, if the bus frequency $f_B$ was always selected to be higher than all the generators on the network, power would be injected into the field of all generators. There would be no requirement for power extraction from the field, therefore the converter supplying the generator field can be made unidirectional reducing the complexity of the converter.

Although the system is suited to aeronautical applications because of the potential for greatly reducing the weight of converters, it could be applied anywhere where power generation from variable-speed prime movers is required to be applied in parallel on a single variable-frequency network. Most other applications requiring the paralleling of generators have a constant network frequency and have a relatively small prime-mover speed range. Examples of this would be land-based renewable power generation or distribution networks onboard marine vessels.

Thus, embodiments of the present invention may include any or all of the following features:
- a multiplicity of independent electrical generators connected to mechanical prime mover(s) and configured so that the bulk of all electrical power drawn from these generators passes through the stator windings;
- the rotors of most, if not all, of these generators can configured with windings such that a rotor magnetic field can be produced which can rotate relative to the body of the rotor itself; This would mean that the rotor is wound with a multi-phase winding with multiple output conductors coupled to the stationary frame through a rotating power transfer device.
- converters fitted to most, if not all, of these generators— specifically, all generators where it is required that the rotor field can rotate relative to the rotor body, since in all such cases power must either be drawn from the rotor (if the rotor field rotates in the direction that reduces net frequency on the stator) or else be fed into the rotor (if the rotor field rotates in the same direction as the rotor body itself thus increasing the net frequency on the stator). The converter power ratings are determined as the product of the air gap torque in the generator air gap times the maximum angular rotational speed of the rotor field relative to the rotor body. The converter interfaces with the common power bus.
- an overall controller which determines the optimal frequency for the common power bus.

The invention claimed is:

1. An electrical distribution system for use with a gas turbine engine, the system comprising:
    a plurality of generators including a primary generator and a secondary generator, the plurality of generators configured to be connected to a gas turbine engine and to output power, the plurality of generators driven at mechanical frequencies that differ from each other;
    a common bus configured to receive the power output from the generators;
    one or more converters disposed between each generator and the bus, the one or more converters configured to influence the frequency of the power output from the generators; and
    a control system configured to (i) set an AC bus frequency in accordance with the power output from the primary generator and (ii) control the converters of the secondary generator to match the primary generator so that the converters feed energy into or draw energy from the generators so that all generators supply the power output at the bus frequency.

2. The electrical system according to claim 1, wherein the control system is further configured to (iii) monitor the mechanical frequency of the generators continually and (iv) calculate a suitable bus frequency.

3. The electrical system according to claim 2, wherein the control system includes converter controllers associated with the converters and communication lines between the controllers.

4. The electrical system according to claim 1, wherein one or more of the generators is a Doubly Fed Induction Generator.

5. The electrical system according to claim 1, wherein the converters are connected to their respective generators via respective power transfer devices.

6. An aircraft comprising:
    at least one gas turbine engine; and
    an electrical system according to claim 1, the electrical system configured to supply electrical power to the at least one gas turbine engine.

7. The aircraft according to claim 6, wherein the aircraft includes two gas turbine engines, and two generators are associated with each engine.

8. An aircraft comprising:
    at least one gas turbine engine;
    a plurality of generators including a primary generator and a secondary generator, the plurality of generators connected to the engine and configured to output power, the plurality of generators driven at mechanical frequencies that differ from each other;
    a common bus configured to receive the power output from the generators;
    one or more converters disposed between each generator and the bus, the one or more converters configured to influence the frequency of the power output from the generators; and
    a control system configured to (i) set an AC bus frequency in accordance with the power output from the primary generator and (ii) control the converters of the secondary generator to match the primary generator so that the converters feed energy into or draw energy from the generators so that all generators supply the power output at the bus frequency.

9. A method of distributing electrical power generated by a gas turbine engine, the method comprising:

outputting power from a plurality of generators including a primary generator and a secondary generator, the plurality of generators being connected to the engine;

driving the plurality of generators at mechanical frequencies that differ from each other;

supplying the power output from the generators to a common bus;

influencing the frequency of the power output from the generators with one or more converters disposed between each generator and the bus;

setting an AC bus frequency in accordance with the power output from the primary generator; and controlling the converters of the secondary generator to match the primary generator so that the converters feed energy into or draw energy from the generators so that all generators supply the power output at the bus frequency.

10. The method according to claim 9, wherein a difference between the mechanical speed of the generators is in the range of 5% or less.

11. The method according to claim 9, further comprising adjusting the output frequency of at least one additional generator to match the primary generator.

* * * * *